(12) United States Patent
Tang et al.

(10) Patent No.: US 9,948,462 B2
(45) Date of Patent: Apr. 17, 2018

(54) HYPERSPHERE-BASED MULTIVARIABLE PUBLIC KEY SIGNATURE/VERIFICATION SYSTEM AND METHOD

(71) Applicant: South China University of Technology, Guangzhou (CN)

(72) Inventors: Shaohua Tang, Guangzhou (CN); Jiahui Chen, Guangzhou (CN)

(73) Assignee: South China University of Technology, Guangzhou, Guangdong (CN)

( * ) Notice: Subject to any disclaimer, the term of this patent is extended or adjusted under 35 U.S.C. 154(b) by 92 days.

(21) Appl. No.: 15/022,435

(22) PCT Filed: Dec. 30, 2014

(86) PCT No.: PCT/CN2014/095592
§ 371 (c)(1),
(2) Date: Mar. 16, 2016

(87) PCT Pub. No.: WO2015/103932
PCT Pub. Date: Jul. 16, 2015

(65) Prior Publication Data
US 2016/0226664 A1    Aug. 4, 2016

(30) Foreign Application Priority Data
Jan. 13, 2014 (CN) .......................... 2014 1 0015214

(51) Int. Cl.
*H04L 9/30* (2006.01)
*H04L 9/06* (2006.01)

(52) U.S. Cl.
CPC .............. *H04L 9/30* (2013.01); *H04L 9/0618* (2013.01); *H04L 9/0643* (2013.01); *H04L 9/3093* (2013.01)

(58) Field of Classification Search
CPC ....... H04L 9/30; H04L 9/0618; H04L 9/0643; H04L 9/3093
See application file for complete search history.

(56) References Cited

U.S. PATENT DOCUMENTS 5,111,512 A * 5/1992 Fan ....................... G07C 9/0015
382/122
7,100,051 B1 * 8/2006 Kipnis .................. H04L 9/3247
380/28

(Continued)

FOREIGN PATENT DOCUMENTS

CN 101383705 A 3/2009
CN 101383705 A 11/2009

(Continued)

OTHER PUBLICATIONS

Glas et al. Prime Field ECDSA Signature Processing for Reconfigurable Embedded Systems, Jan. 2011, International Journal of Reconfigurable Computing; Article 5, pp. 1-12.*

(Continued)

*Primary Examiner* — Kenneth W Chang
(74) *Attorney, Agent, or Firm* — Miller, Matthias & Hull LLP

(57) ABSTRACT

A hypersphere-based multivariable public key signature/verification system includes signature and verification modules, wherein the signature module comprises a processor, an affine transformation inversion part I, a trap door part and an affine transformation inversion part II. Corresponding operations are sequentially executed on a message, one or more groups of solutions are produced after the processing of the trapdoor part, a group of solutions are randomly selected, then a signature is continuously produced by the various parts, and finally the signature, together with the message, is transmitted to the processor. The verification module comprises a processor and a public key transforma- (Continued)

tion part, wherein the processor transmits a signature to the public key transformation part to execute an operation, and then judges whether the obtained data is equal to a message in a memory or not: if so, the signature is valid, otherwise the signature is invalid.

4 Claims, 1 Drawing Sheet

(56) References Cited

U.S. PATENT DOCUMENTS

| | | | | |
|---|---|---|---|---|
| 2008/0013716 | A1* | 1/2008 | Ding | H04L 9/3093 380/30 |
| 2010/0183147 | A1* | 7/2010 | Billet | H04L 9/3093 380/30 |
| 2011/0058668 | A1 | 3/2011 | Yang et al. | |
| 2011/0296188 | A1 | 12/2011 | Sakumoto et al. | |
| 2013/0177151 | A1* | 7/2013 | Sella | H04L 9/3093 380/30 |
| 2014/0321642 | A1* | 10/2014 | El Aimani | H04L 9/3218 380/44 |

FOREIGN PATENT DOCUMENTS

| | | |
|---|---|---|
| CN | 101977109 A | 2/2011 |
| CN | 103457726 A | 12/2013 |
| CN | 103490883 A | 1/2014 |
| CN | 103490897 A | 1/2014 |
| CN | 103780383 A | 5/2014 |

OTHER PUBLICATIONS

Quraishi et al., A novel signature verification and authentication system using image transformations and Artificial Neural Network, Jun. 2013, World Congress on Computer and Information Technology, pp. 1-6 (Year: 2013).*

International Search Report Application No. PCT/CN14/095592 reported on Mar. 30, 2015.

International Search Report related to Application No. PCT/CN2014/095592 reported on Mar. 30, 2015.

Chinese Search Report and Office Action related to Application No. 201410015214.6 reported on May 11, 2016.

Second Chinese Office Action related to Application No: 201410015214.6 dated Nov. 28, 2016.

European Search Report related to Application No. EP 14877771.7 dated Mar. 13, 2017.

First European Office Action related to Application No. EP 1487771.7 dated Jun. 7, 2017.

Houzhen Wang et al: "Extended multivariate public key cryptosystems with secure encryption function", Science China Information Sciences, vol. 54, No. 6, May 24, 2011, pp. 1161-1171, XP55351529, Heideberg.

* cited by examiner

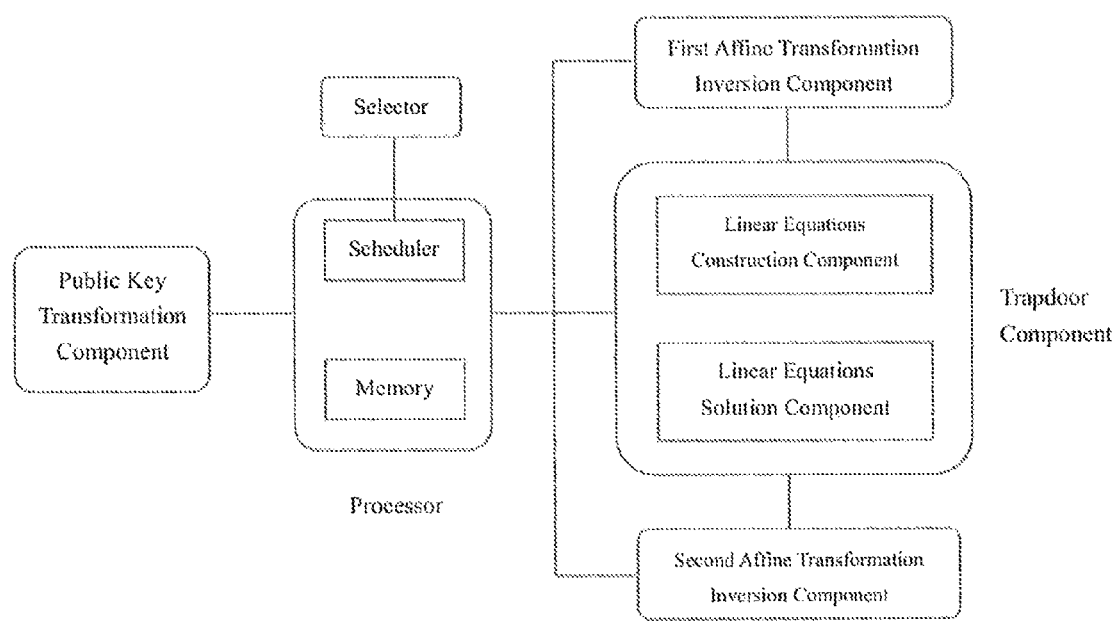

HYPERSPHERE-BASED MULTIVARIABLE PUBLIC KEY SIGNATURE/VERIFICATION SYSTEM AND METHOD

CROSS-REFERENCE TO RELATED APPLICATION

This patent application is a 35 USC § 371 U.S. national stage of International Application No. PCT/CN2014/095592, filed on Dec. 30, 2014, which claims priority under the Paris Convention to the Chinese Patent Applications No. CN 201410015214.6 filed on Jan. 13, 2014.

FIELD OF THE DISCLOSURE

The present disclosure relates generally to the field of information security, and more particularly, to a system and method for multivariate public key signature/verification based on hypersphere.

BACKGROUND OF THE DISCLOSURE

In today's technology-driven society, with the rapid development and wide-ranging application of the computer's computing power and the network communication technology, especially the popularity of the Internet, human society has already stepped into the information age, and the development of the information technology is changing the traditional modes of business operation, production and life. With the advent of the information age, people want rapid and long-distance trades via digital communication networks. In such digital information world, traditional handwritten signatures and signature stamps have become difficult to work effectively, so there is an urgent need for digital signature method which provides functionality similar to the handwritten signature and signature stamp. Especially in recent years, the digital cryptography has grown greatly. There may be no internationalization of E-commerce and safe and reliable operations of the corporate infrastructure without using this technology. The digital signature can ensure the accuracy of the identity of the e-mail sender and the identity of the signer of the contract document as effective and authentic in the traditional handwritten signatures.

At present, the security of the digital signature technology relies largely on the intractability of the large integer factorization and discrete logarithm problem, such as RSA or ECC. However, such traditional digital signature technology has been under great threat since it was proposed that the method for factoring large integer and the method for solving discrete logarithm can be implemented in a quantum computer, which affects all professions and trades. Therefore, people began to find a signature scheme which can protect against quantum computer attacks to meet the requirements of the information security, and such scheme is called as post quantum signature scheme, and multivariate public key signature is one of them.

The multivariate public key signature plays an important role in the quantum signature scheme. The existing multi-variable schemes are almost always insecure because of the quadratic equation in a random design having no threshold, and therefore are not available for signature and verification. For a mathematical structure generated by a corresponding center map, the center map of the mathematical structure is generally derivable (that is, the center map is not hidden), such that there is a structural problem in many multivariate signature schemes in addition to the MQ problem, and many schemes such as S flash have been completely broken. A common technique in the current multivariate signature schemes is "Large Field Technology" which maps the public key to a large field K and performs isomorphism using vectors (that is, the isomorphism is required). This approach is a double-edged sword, because the structure of K makes decryption easier, but such a structure is easy for attackers to exploit. In addition, the popular multivariate public key signature schemes include UOV and Rainbow. The signature process of the former requires only to solve a system of linear equations, so the signature is very fast. However, because of mixing the Oil variables (the number of which corresponds to the digits of the message) and the Vinegar variables in the polynomial of the private key map during the process of constructing the center map, the number of variables of the entire public key map corresponding to the private key map is very large, and the length of the public key is very long, which is disadvantage to practical application. The latter is substantially a UOV scheme with a multi-layered structure, so it is inevitable to have defects of UOV.

SUMMARY OF THE DISCLOSURE

The main object of the present disclosure is to provide a system for multivariate public key signature/verification based on hypersphere in order to address the deficiencies and inadequacies in the art.

Another object of the present disclosure is to provide a method for multivariate public key signature/verification based on hypersphere.

The object of the invention is achieved by the following technical solution.

A system for multivariate public key signature/verification based on hypersphere includes:

a signature module, configured to sign a message to be signed, including a processor, a first affine transformation inversion component, a trapdoor component and a second affine transformation inversion component, wherein the trapdoor component includes a linear equations construction component and a linear equations solution component, the processor is adapted to store the message to be signed and transmit the message to be signed to the first affine transformation inversion component, the first affine transformation inversion component is adapted to perform affine transformation inversion on the message, the trapdoor component is adapted to receive the message processed by the first affine transformation inversion component from the first affine transformation inversion component, the linear equations construction component and the linear equations solution component in the trapdoor component are adapted to perform operations of constructing a system of linear equations and solving the system of linear equations about the processed message respectively, to obtain a solution set forming by one group or multiple groups of solutions from the operation of solving the system of linear equations, the second affine transformation inversion component is adapted to receive any one group of solutions selected from the solution set and perform affine transformation inversion on the group of solutions to generate a required signature, and the processor is also adapted to send the message and the signature to an end user; and a verification module, configured to receive a message and a signature of the message sent from other users, and verify the validity of the signature, including a processor and a public key transformation component, wherein the processor is adapted to store the message and the signature of the message and transmit the signature to the public key transformation component, the public key transformation component is adapted to substitute the signature into each of multivariate polynomials of a public key map, the processor is also adapted to receive data calculated by the public key transformation component and determine whether the data is equal to the message stored in the processor: if the data is equal to the message, the processor outputs "1" to the end user, indicating that the signature is valid; otherwise, the processor outputs "0" to the end user, indicating that the signature is invalid.

The system for multivariate public key signature/verification based on hypersphere further includes a selector coupled to the processor, wherein, when the selector is in an open state, the signature module is operatable, and when the selector is in a close state, the verification module is operatable. In a general signature/verification system, a first user may sign a message to be signed with the signature module to form a signature, and the signature and the original message may be transmitted to a second user, the second user may verify the validity of the signature with the verification module, the process of the signature and the process of the verification make a whole process of the signature/verification system, and vice versa, that is, the second user may sign a message to be signed with the signature module to form a signature, and the signature and the original message may be transmitted to the first user, the first user may verify the validity of the signature with the verification module. Therefore both of two different and separate devices (signature module and verification module) are required for one user, then they can meet the demands, which is inconvenient for users. The system for multivariate public key signature/verification based on hypersphere is very convenient by including the selector with which only one device is required for one user that the user can select the device to perform signature or verification as needed.

The processor includes a scheduler coupled to the selector, wherein the scheduler is configured to identify and manage the open state and close state of the selector, and to control and manage data stored in the processor to be scheduled to a corresponding component for a corresponding operation.

The processor further includes a memory configured to implement data storage of the processor.

The other object of the invention is achieved by the following technical solution.

A method for multivariate public key signature/verification based on hypersphere includes the following steps:

signature process:

step A, receiving, by a processor, a message to be signed, storing the message and transmitting the message to a first affine transformation inversion component for performing affine transformation inversion on the message;

step B, transmitting the message processed by the first affine transformation inversion component to a trapdoor component, and performing operations of constructing a system of linear equations and solving the system of linear equations about the processed message respectively by a linear equations construction component and a linear equations solution component in the trapdoor component, to obtain a solution set forming by one group or multiple groups of solutions from the operation of solving the system of linear equations;

step C, selecting any one group of solutions from the solution set and transmitting the group of solutions to the second affine transformation inversion component for performing affine transformation inversion on the group of solutions; and step D, using the result finally obtained in the step C as a signature of the message, transmitting the message and the signature to an end user by the processor; and verification process:

step E, receiving, by the processor, the message and the signature of the message, storing the message and the signature, and transmitting the signature to a public key transformation component; and step F, substituting, by the public key transformation component, the signature into each of multivariate polynomials of a public key map, returning data calculated by the public key transformation component to the processor, and determining whether the data is equal to the message stored in the processor by the processor: if the data is equal to the message, the processor outputs "1" to the end user, indicating that the signature is valid; otherwise, the processor outputs "0" to the end user, indicating that the signature is invalid.

Specifically, the signature process includes:

step A, receiving, by a processor, a message to be signed $(y_1', \ldots, y_n') \in F^n$, storing the message $(y_1', \ldots, y_n') \in F^n$ and transmitting the message $(y_1', \ldots, y_n') \in F^n$ to a first affine transformation inversion component for performing affine transformation inversion on the message $(\overline{y}_1', \ldots, \overline{y}_n') = T^{-1}(y_1', \ldots, y_n')$;

step B, transmitting the message processed by the first affine transformation inversion component $(\overline{y}_1', \ldots, \overline{y}_n')$ to a trapdoor component, and performing operations of constructing a system of linear equations and solving the system of linear equations about the processed message respectively by a linear equations construction component and a linear equations solution component in the trapdoor component, that is, the linear equations construction component simultaneously using in groups of data $(c_{i,1}, c_{i,2}, \ldots, c_{i,n})$ and $(\widetilde{y}_1, \ldots, \widetilde{y}_m)$ pre-allocated by a scheduler in the trapdoor component to construct a first system of equations as below:

$$\begin{cases} (\widetilde{x}_1 - c_{1,1})^2 + \ldots + (\widetilde{x}_n - c_{1,n})^2 = \widetilde{y}_1 \\ \ldots \\ (\widetilde{x}_1 - c_{m,1})^2 + \ldots + (\widetilde{x}_n - c_{m,n})^2 = \widetilde{y}_m \end{cases},$$

Extending the first system of equations to a second system of equations:

$$\begin{cases} (\widetilde{x}_1^2 - 2c_{1,1}\widetilde{x}_1 + c_{1,1}^2) + \ldots + (\widetilde{x}_n^2 - 2c_{1,n}\widetilde{x}_n + c_{1,n}^2) = \widetilde{y}_1 \\ \ldots \\ (\widetilde{x}_1^2 - 2c_{m,1}\widetilde{x}_1 + c_{m,1}^2) + \ldots + (\widetilde{x}_n^2 - 2c_{m,n}\widetilde{x}_n + c_{m,n}^2) = \widetilde{y}_m \end{cases},$$

subtracting the second system of equations from the first system of equations to have a third system of equations:

$$\begin{cases} (2c_{2,1} - 2c_{1,1})\widetilde{x}_1 + \ldots + (2c_{2,n} - 2c_{1,n})\widetilde{x}_n + (c_{1,1}^2 - c_{2,1}^2) + \ldots + \\ (c_{1,n}^2 - c_{2,n}^2) = \widetilde{y}_1 - \widetilde{y}_2 \\ \ldots \\ (2c_{m,1} - 2c_{m-1,1})\widetilde{x}_1 + \ldots + (2c_{m,n} - 2c_{m-1,n})\widetilde{x}_n + (c_{m-1,1}^2 - c_{m,1}^2) + \ldots + \\ (c_{m-1,n}^2 - c_{m,n}^2) = \widetilde{y}_{m-1} - \widetilde{y}_m \end{cases},$$

and converting the third system of equations into a matrix form to have a fourth system of equations:

$$\begin{bmatrix} (2c_{2,1}-2c_{1,1}) & \ldots & (2c_{2,n}-2c_{1,n}) \\ & \ldots & \\ (2c_{m,1}-2c_{m-1,1}) & \ldots & (2c_{m,n}-2c_{m-1,n}) \end{bmatrix} \begin{bmatrix} \tilde{x}_1 \\ \ldots \\ \tilde{x}_n \end{bmatrix} =$$

$$\begin{bmatrix} (\overline{\tilde{y}_1} - \overline{\tilde{y}_2}) + \sum_{j=1}^{n}(c_{2,j}^2 - c_{1,j}^2) \\ \ldots \\ (\overline{\tilde{y}_{m-1}} - \overline{\tilde{y}_m}) + \sum_{j=1}^{n}(c_{m,j}^2 - c_{m-1,j}^2) \end{bmatrix},$$

wherein the fourth system of equations is the system of linear equations about $(\tilde{x}_1, \ldots, \tilde{x}_n)$ constructed by the linear equations construction component; and solving, by the linear equations solution component, the fourth system of equations with a Gaussian elimination method to have one group or multiple groups of solutions, wherein the number of group is set as d, and the solution set forming by the one group or multiple groups of solutions is denoted by $(\tilde{x}_{i1}, \ldots, \tilde{x}_{in})$, $(1 \le i \le d)$;

step C, selecting any one group of solutions $(\overline{x}_1, \ldots, \overline{x}_n)$ from the solution set and transmitting the group of solutions to the second affine transformation inversion component for performing affine transformation inversion on the group of solutions $(x_1', \ldots, x_n') = S^{-1}(\overline{x}_1, \ldots, \overline{x}_n)$; and step D, using the result $(x_1', \ldots, x_n')$ finally obtained in the step C as a signature of the message, transmitting the message $(y_1', \ldots, y_n')$ and the signature $(x_1', \ldots, x_n')$ to an end user by the processor.

Specifically, the verification process includes:

step E, receiving, by the processor, the message $(y_1', \ldots, y_n')$ and the signature $(x_1', \ldots, x_n')$ of the message, storing the message $(y_1', \ldots, y_n')$ and the signature $(x_1', \ldots, x_n')$, and transmitting the signature $(x_1', \ldots, x_n')$ to a public key transformation component; and step F, substituting, by the public key transformation component, the signature $(x_1', \ldots, x_n')$ into each of multivariate polynomials of a public key map $P(x_1, \ldots x_n)$, that is, calculating $p_1(x_1', \ldots, x_n'), \ldots, p_n(x_1', \ldots, x_n')$ respectively to have results respectively denoted by $y_1'', \ldots, y_n''$, transmitting $y_1'', \ldots, y_n''$ to the processor by the public key transformation component, and determining whether $y_1'', \ldots, y_n''$ is equal to the message $(y_1', \ldots, y_n')$ stored in the processor by the processor: if the data is equal to the message, the processor outputs "1" to the end user, indicating that the signature is valid; otherwise, the processor outputs "0" to the end user, indicating that the signature is invalid.

Before the signature process, the method for multivariate public key signature/verification further includes the following step: making the signature module be operatable when a selector coupled to the processor is in an open state; and before the verification process, the method further includes the following step: making the verification module be operatable when a selector coupled to the processor is in a close state.

The processor includes a scheduler coupled to the selector, wherein the scheduler is configured to identify and manage the open state and close state of the selector, and to control and manage data stored in the processor to be scheduled to a corresponding component for a corresponding operation.

The processor further includes a memory configured to implement data storage of the processor.

Compared with the prior art, the present disclosure has the following advantages and beneficial effects.

1. "Large field technology" is not used here to avoid using an isomorphism component to perform vector isomorphism, while it facilities the signature. For the "large field technology", it maps the public key to a large field K and performs isomorphism using a vector (that is, the isomorphism is required). This approach is a double-edged sword, because the structure of K makes decryption easier, but such a structure is easy for attackers to exploit. The solution presented here completely excludes this technology, while the signature process of the solution presented here does not become complex by lacking the isomorphism technology.

2. The designed center map is completely hidden by N groups of "sphere centers" as private keys, such that even if a attacker knows the structure of the system, he or she cannot get any beneficial assistance. For the design of the center map, m random n-demission "sphere centers" are set as hidden parameters (private keys). For the signature, the geometric meaning of the signature is how to find out points on the hypersphere meeting the conditions on the basis of knowing the sphere center and distance, so that the geometric meaning of the signature verification is in "squares of distance".

3. The signature process only needs to solve one system of linear equations that the operating speed is very fast. At present, many signature schemes, such as Sflash scheme in the multivariate schemes and almost all traditional ECC and RSA signature algorithms, require to perform complex mathematical operations such as magnitude calculation or scalar multiplication, so the signature process may be slow. For the signature scheme presented here, the signature process only needs to solve the system of linear equations set, and the Gaussian elimination method used here is significantly lower in operation complexity than the most existing schemes.

4. The length of the public key has advantages over some technologies in the prior art. For some existing multivariate signature schemes, such as UOV and Rainbow, mixing the Oil variables (the number of which corresponds to the digits of the message) and the Vinegar variables in the polynomial of the private key map during the process of constructing the center map, the number of variables of the entire public key map corresponding to the private key map is very large, and the length of the public key is very long. The scheme presented here only needs to embed the message into the center map, so that it has advantages over the exiting schemes for the length of the public key.

BRIEF DESCRIPTION OF THE DRAWINGS

FIG. 1 is a structure diagram illuminating a system for multivariate public key signature/verification based on hypersphere according to one embodiment of the present disclosure.

DETAILED DESCRIPTION OF THE DISCLOSURE

As shown in FIG. 1, a system for multivariate public key signature/verification based on hypersphere, including:

A. a selector coupled to the processor, wherein, when the selector is in an open state, the signature module is operatable, and when the selector is in a close state, the verification module is operatable;

B. a signature module, configured to sign a message to be signed, including a processor, a first affine transformation inversion component, a trapdoor component and a second affine transformation inversion component, wherein the trapdoor component includes a linear equations construction component and a linear equations solution component, the processor is adapted to store the message to be signed and transmit the message to be signed to the first affine transformation inversion component, the first affine transformation inversion component is adapted to perform affine transformation inversion on the message, the trapdoor component is adapted to receive the message processed by the first affine transformation inversion component from the first affine transformation inversion component, the linear equations construction component and the linear equations solution component in the trapdoor component are adapted to perform operations of constructing a system of linear equations and solving the system of linear equations about the processed message respectively, to obtain a solution set forming by one group or multiple groups of solutions from the operation of solving the system of linear equations, the second affine transformation inversion component is adapted to receive any one group of solutions selected from the solution set and perform affine transformation inversion on the group of solutions to generate a required signature, and the processor is also adapted to send the message and the signature to an end user; and C. a verification module, configured to receive a message and a signature of the message sent from other users, and verify the validity of the signature, including a processor and a public key transformation component, wherein the processor is adapted to store the message and the signature of the message and transmit the signature to the public key transformation component, the public key transformation component is adapted to substitute the signature into each of multivariate polynomials of a public key map, the processor is also adapted to receive data calculated by the public key transformation component and determine whether the data is equal to the message stored in the processor: if the data is equal to the message, the processor outputs "1" to the end user, indicating that the signature is valid; otherwise, the processor outputs "0" to the end user, indicating that the signature is invalid.

Before using the system for multivariate public key signature/verification based on hypersphere for the first time, the system is required to be initialized as below:

1. Arithmetic operations of all components of the system are based on a finite field F of cardinality q, where q is an odd prime number;

2. Let the number of equations of the multivariate public key cryptosystem be in and the number of variates be n;

3. In the first affine transformation inversion component, let $T(\bar{y}_1, \ldots, \bar{y}_m') = (y_1, \ldots, y_m)$ be a randomly selected invertible affine transformation from $F^m$ to $F^m$, similarly, in the second affine transformation inversion component, let $S(x_1, \ldots, x_n) = (\bar{x}_1, \ldots, \bar{x}_n)$ be a randomly selected invertible affine transformation from $F^n$ to $F^n$;

4. In the trapdoor component, the system randomly selects m groups of sphere centers $(c_{i,1}, c_{i,2}, \ldots, c_{i,n})$, where $c_{i,j} \in f_q, 1 \leq i \leq m, 1 \leq j \leq n$;

5. In the public key transformation component, initialize the center map $F = (f_1, \ldots, f_m)$, that is, m $f_i$s form the center map. Let $f_i = (x_1 - c_{i,1})^2 + (x_2 - c_{i,2})^2 + \ldots + (x_n - c_{i,n})^2$, $1 \leq i \leq m$, where $(c_{i,1}, c_{i,2}, \ldots, c_{i,n})$ are m groups of sphere centers randomly selected by the system in the trapdoor component. Let $P = T \cdot F \cdot S(x_1, \ldots, x_n)$ which is the corresponding public key map.

6. The above data about mapping is stored in the memory after the system is initialized, and in work process of the system, the data is controlled by the scheduler and scheduled to a corresponding component for corresponding operation.

A method for multivariate public key signature/verification based on hypersphere includes the following steps:

(1) signature process:

a. when the selector is in the open state, the signature module of the system running, the selector being coupled to the scheduler of the processor, and after receiving a message to be signed $(y_1', \ldots, y_n') \in F^n$, storing the message $(y_1', \ldots, x_n') \in F^n$ and transmitting the message $(y_1', \ldots, y_n') \in F^n$ to the first affine transformation inversion component for performing affine transformation inversion on the message $(\bar{y}_1, \ldots, \bar{y}_n) = T^{-1}(y_1', \ldots, y_n')$;

b. transmitting the message processed by the first affine transformation inversion component $(\bar{y}_1, \ldots, \bar{y}_n)$ to a trapdoor component, and performing operations of constructing a system of linear equations and solving the system of linear equations about the processed message respectively by a linear equations construction component and a linear equations solution component in the trapdoor component, that is, the linear equations construction component simultaneously using m groups of data $(c_{i,1}, c_{i,2}, \ldots, c_{i,n})$ and $(\widetilde{y_i}, \ldots, \widetilde{y_m})$ pre-allocated by a scheduler in the trapdoor component to construct a first system of equations (1) as below:

$$\begin{cases} (\widetilde{x_1} - c_{1,1})^2 + \ldots + (\widetilde{x_n} - c_{1,n})^2 = \widetilde{y_1} \\ \ldots \\ (\widetilde{x_1} - c_{m,1})^2 + \ldots + (\widetilde{x_n} - c_{m,n})^2 = \widetilde{y_m} \end{cases} \quad (1)$$

Extending the first system of equations (1) to a second system of equations (2):

$$\begin{cases} (\widetilde{x_1}^2 - 2c_{1,1}\widetilde{x_1} + c_{1,1}^2) + \ldots + (\widetilde{x_n}^2 - 2c_{1,n}\widetilde{x_n} + c_{1,n}^2) = \widetilde{y_1} \\ \ldots \\ (\widetilde{x_1}^2 - 2c_{m,1}\widetilde{x_1} + c_{m,1}^2) + \ldots + (\widetilde{x_n}^2 - 2c_{m,n}\widetilde{x_n} + c_{m,n}^2) = \widetilde{y_m} \end{cases} \quad (2)$$

For the second system of equations, subtracting the second equation from the first equation, . . . , and subtracting the m−1 equation from the in equation to have a third system of equations (3):

$$\begin{cases} (2c_{2,1} - 2c_{1,1})\widetilde{x_1} + \ldots + (2c_{2,n} - 2c_{1,n})\widetilde{x_n} + (c_{1,1}^2 - c_{2,1}^2) + \ldots + \\ (c_{1,n}^2 - c_{2,n}^2) = \widetilde{y_1} - \widetilde{y_2} \\ \ldots \\ (2c_{m,1} - 2c_{m-1,1})\widetilde{x_1} + \ldots + (2c_{m,n} - 2c_{m-1,n})\widetilde{x_n} + \\ (c_{m-1,1}^2 - c_{m,1}^2) + \ldots + (c_{m-1,n}^2 - c_{m,n}^2) = \widetilde{y_{m-1}} - \widetilde{y_m} \end{cases} \quad (3)$$

and converting the third system of equations (3) into a matrix form to have a fourth system of equations (4):

$$\begin{bmatrix} (2c_{2,1} - 2c_{1,1}) & \ldots & (2c_{2,n} - 2c_{1,n}) \\ & \ldots & \\ (2c_{m,1} - 2c_{m-1,1}) & \ldots & (2c_{m,n} - 2c_{m-1,n}) \end{bmatrix} \begin{bmatrix} \widetilde{x_1} \\ \ldots \\ \widetilde{x_n} \end{bmatrix} = \quad (4)$$

-continued $$\begin{bmatrix} (\widetilde{y_1} - \widetilde{y_2}) + \sum_{j=1}^{n}(c_{2,j}^2 - c_{1,j}^2) \\ \ldots \\ (\widetilde{y_{m-1}} - \widetilde{y_m}) + \sum_{j=1}^{n}(c_{m,j}^2 - c_{m-1,j}^2) \end{bmatrix},$$

wherein the fourth system of equations (4) is the system of linear equations about ($\widetilde{x_1}, \ldots, \widetilde{x_n}$) constructed by the linear equations construction component; and solving, by the linear equations solution component, the fourth system of equations (4) with a Gaussian elimination method to have one group or multiple groups of solutions, wherein the number of group is set as d, and the solution set forming by the one group or multiple groups of solutions is denoted by ($\widetilde{x_{i_1}}, \ldots, \widetilde{x_{i_n}}$), (1≤i≤d);

c. selecting any one group of solutions ($\overline{x}_1, \ldots, \overline{x}_n$) from the solution set and transmitting the group of solutions to the second affine transformation inversion component for performing affine transformation inversion on the group of solutions $(x_1', \ldots, x_n')=S^{-1}(\overline{x}_1, \ldots, \overline{x}_n)$; and d. using the result $(x_1', \ldots, x_n')$ finally obtained in the step C as a signature of the message, transmitting the message $(y_1', \ldots, y_n')$ and the signature $(x_1', \ldots, x_n')$ to an end user by the processor.

(2) Verification Process:

a. when the selector is in the close state, the verification module of the system running, the selector being coupled to the scheduler of the processor, and receiving, by the processor, the message $(y_1', \ldots, y_n')$ and the signature $(x_1', \ldots, x_n')$ of the message, storing the message $(y_1', \ldots, y_n')$ and the signature $(x_1', \ldots, x_n')$, and transmitting the signature $(x_1', \ldots, x_n')$ to a public key transformation component; and b. substituting, by the public key transformation component, the signature $(x_1', \ldots, x_n')$ into each of multivariate polynomials of a public key map $P(x_1, \ldots, x_n)$ that is, calculating $p_1(x_1', \ldots, x_n'), \ldots, p_n(x_1', \ldots, x_n')$ respectively to have results respectively denoted by $y_1'', \ldots, y_n''$, transmitting $y_1'', \ldots, y_n''$ to the processor by the public key transformation component, and determining whether $y_1'', \ldots, y_n''$ is equal to the message $(y_1', \ldots, y_n')$ stored in the processor by the processor: if the data is equal to the message, the processor outputs "1" to the end user, indicating that the signature is valid; otherwise, the processor outputs "0" to the end user, indicating that the signature is invalid.

The initialization of the system will be further described in detail with a specific embodiment.

1. Arithmetic operations of all components are based on a finite field F of cardinality q=3, where the base field F includes three elements which are {0,1,2} and the addition and multiplication defined in the field are integer addition and multiplication followed by a mod 3 operation;

2. The number of equations of the multivariate public key cryptosystem is m=3 and the number of variates is n=3;

3. In the first affine transformation inversion component, initialize $$T(\overline{y_1}, \overline{y_2}, \overline{y_3}) = \begin{bmatrix} 2\overline{y_1} + 2\overline{y_2} + 2\overline{y_3} \\ \overline{y_1} + 2\overline{y_2} + \overline{y_3} \\ 2\overline{y_3} \end{bmatrix},$$

and in the second affine transformation inversion component, initialize $$S(x_1, x_2, x_3) = \begin{bmatrix} x_3 \\ 2x_1 + x_2 \\ x_1 + 2x_3 \end{bmatrix};$$

4. In the trapdoor component, randomly select three groups of "sphere centers": (2,0,2), (0,2,2), (0,0,1);

5. In the public key transformation component, firstly build center map F:

$$f_1(\overline{x}_1,\overline{x}_2,\overline{x}_3)=(\overline{x}_1-2)^2+(\overline{x}_2-0)^2+(\overline{x}_3-2)^2,$$

$$f_2(\overline{x}_1,\overline{x}_2,\overline{x}_3)=(\overline{x}_1-0)^2+(\overline{x}_2-2)^2+(\overline{x}_3-2)^2, \text{ and}$$

$$f_3(\overline{x}_1,\overline{x}_2,\overline{x}_3)=(\overline{x}_1-0)^2+(\overline{x}_2-0)^2+(\overline{x}_3-1)^2.$$

Use $P=T \cdot F \cdot S(x_1, \ldots, x_n)$ to have the public key transformation P:

$$p_1(x_1,x_2,x_3)=x_2+1,$$

$$p_2(x_1,x_2,x_3)=2x_1^2+x_1x_2+x_1x_3+x_2^2+x_2+2x_3^2+x_3+1, \text{ and}$$

$$p_3(x_1,x_2,x_3)=x_1^2+2x_1x_2+2x_1x_3+2x_1+2x_2^2+x_3^2+x_3+2.$$

After initialization, the system can be used normally.

The signature and verification for the message for instance (2,0,0) will be described in detail in the following.

Signature Process:

1. The selector is in the open state.

2. For the message (2, 0, 0) to be signed, the input end may transmit it to the processor which may store the message in the memory, and the processor may transmit the message to the first affine transformation inversion component.

3. After receiving the data (2,0,0), the first affine transformation inversion component may interact with the processor, call programs and calculate $T^{-1}(2,0,0)=(2,2,0)$, and transmit the result to the trapdoor component.

4. After receiving the data (2,2,0), the trapdoor component may interact with the processor, call the linear equations construction component which may use the three groups of sphere centers (2,0,2), (0,2,2), (0,0,1) and (2,2,0) pre-allocated by a scheduler in the trapdoor component to construct a system of equations i.e., $$\begin{cases} f_1(\widetilde{x}_1, \widetilde{x}_2, \widetilde{x}_3) = (\widetilde{x}_1 - 2)^2 + (\widetilde{x}_2 - 0)^2 + (\widetilde{x}_3 - 2)^2 = 2 \\ f_2(\widetilde{x}_1, \widetilde{x}_2, \widetilde{x}_3) = (\widetilde{x}_1 - 0)^2 + (\widetilde{x}_2 - 2)^2 + (\widetilde{x}_3 - 2)^2 = 2 \\ f_3(\widetilde{x}_1, \widetilde{x}_2, \widetilde{x}_3) = (\widetilde{x}_1 - 0)^2 + (\widetilde{x}_2 - 0)^2 + (\widetilde{x}_3 - 1)^2 = 0 \end{cases}$$

Expand the above three equations to have:

$$\begin{cases} \widetilde{x}_1^2 - 4\widetilde{x}_1 + 4 + \widetilde{x}_2^2 + \widetilde{x}_3^2 - 4\widetilde{x}_3 + 4 = 2 \\ \widetilde{x}_1^2 + \widetilde{x}_2^2 - 4\widetilde{x}_2 + 4 + \widetilde{x}_3^2 - 4\widetilde{x}_3 + 4 = 2 \\ \widetilde{x}_1^2 + \widetilde{x}_2^2 + \widetilde{x}_3^2 - 2\widetilde{x}_3 + 1 = 0 \end{cases}$$

subtract the second equation from the first equation, and subtract the third equation from the second equation to have:

$$\begin{cases} \tilde{x}_1 - \tilde{x}_2 = 0 \\ 2\tilde{x}_2 + \tilde{x}_3 = 1 \end{cases}.$$

The above equations are the system of linear equations constructed by the linear equations construction component. Then the trapdoor component may call the linear equations solution component to solve the system of linear equations about unknown variables to have three groups of solutions (2,2,0), (0,0,1), (1,1,2). Finally the trapdoor component may transmit one group of solutions (1,1,2) to the second affine transformation inversion component.

5. After receiving the group of solutions (1,1,2), the second affine transformation inversion component may interact with the processor, run programs and calculate $S^{-1}(1,1,2)$, to have the result (0,1,1), and return the result to the memory.

6. The processor treats (0,1,1) as the signature of the message (2,0,0), and output the "message-signature pair" (0,1,1)‖(2,0,0) to the user (or the device). With this, the signature process is finished.

Verification Process:

1. The selector is in the close state.

2. For the "message-signature pair" (0,1,1)‖(2,0,0) to be verified, the input end may transmit it to the processor, the processor may store the "message-signature pair" in the memory, next, and the processor may transmit the message (0,1,1) to the public key transformation component.

3. After receiving the message (0,1,1), the public key transformation component may interact with the processor, call the function P to calculate ($p_1(0, 1, 1)$, $p_2(0,1,1)$, $p_3(0,1,1)$), get the result res=(2,0,0), and return the result res=(2,0,0) to the memory.

4. The processor may verify whether res=(2,0,0) is equal to the message (2,0,0) in the "message-signature pair". They are obviously equal here, so the processor may output "1" to the end user or device, to indicate that the signature is valid.

The above embodiments are simple embodiments of the present disclosure, but the implement of the present disclosure is not limited by the above embodiments. The recommended system parameters of the present disclosure include q=31, n=34, and m=25 wherein the security level is up to $2^{80}$. Alternative embodiments will become apparent to those skilled in the art to which the present disclosure pertains without departing from its spirit and scope.

The invention claimed is:

1. A method for multivariate public key signature/verification, based on hypersphere, comprising:

a signature process:

step A, receiving, by a processor, a message to be signed, storing the message and transmitting the message to a first affine transformation inversion component for performing affine transformation inversion on the message;

step B, transmitting the message processed by the first affine transformation inversion component to a trapdoor component, and performing operations of constructing a system of linear equations and solving the system of linear equations about the processed message respectively by a linear equations construction component and a linear equations solution component in the trapdoor component, to obtain a solution set forming by one group or multiple groups of solutions from the operation of solving the system of linear equations;

step C, selecting any one group of solutions from the solution set and transmitting the group of solutions to the second affine transformation inversion component for performing affine transformation inversion on the group of solutions; and step D, using the result finally obtained in the step C as a signature of the message, transmitting the message and the signature to an end user by the processor; and a verification process:

step E, receiving, by the processor, the message and the signature of the message, storing the message and the signature, and transmitting the signature to a public key transformation component; and step F, substituting, by the public key transformation component, the signature into each of multivariate polynomials of a public key map, returning data calculated by the public key transformation component to the processor, and determining whether the data is equal to the message stored in the processor by the processor: if the data is equal to the message, the processor outputs "1" to the end user, indicating that the signature is valid; otherwise, the processor outputs "0" to the end user, indicating that the signature is invalid;

wherein the signature process further comprises:

in Step A, the message to be signed is $(y_1', \ldots, y_n') \in F^n$ and the affine transformation inversion is $(\bar{y}_1, \ldots, \bar{y}_n) = T^{-1}(y_1', \ldots, y_n')$ in step B, the message processed by the first affine transformation inversion component is $(\bar{y}_1, \ldots, \bar{y}_n)$, and the linear equations construction component simultaneously uses m groups of data $(c_{i,1}, c_{i,2}, \ldots, c_{i,n})$ and $(\tilde{y}_1, \ldots, \tilde{y}_m)$ pre-allocated by a scheduler in the trapdoor component to construct a first system of equations as below:

$$\begin{cases} (\tilde{x}_1 - c_{1,1})^2 + \ldots + (\tilde{x}_n - c_{1,n})^2 = \tilde{y}_1 \\ \ldots \\ (\tilde{x}_1 - c_{m,1})^2 + \ldots + (\tilde{x}_n - c_{m,n})^2 = \tilde{y}_m \end{cases}$$

extending the first system of equations to a second system of equations:

$$\begin{cases} (\tilde{x}_1^2 - 2c_{1,1}\tilde{x}_1 + c_{1,1}^2) + \ldots + (\tilde{x}_n^2 - 2c_{1,n}\tilde{x}_n + c_{1,n}^2) = \tilde{y}_1 \\ \ldots \\ (\tilde{x}_1^2 - 2c_{m,1}\tilde{x}_1 + c_{m,1}^2) + \ldots + (\tilde{x}_n^2 - 2c_{m,n}\tilde{x}_n + c_{m,n}^2) = \tilde{y}_m \end{cases},$$

subtracting the second system of equations from the first system of equations to obtain a third system of equations:

$$\begin{cases} (2c_{2,1} - 2c_{1,1})\tilde{x}_1 + \ldots + (2c_{2,n} - 2c_{1,n})\tilde{x}_n + (c_{1,1}^2 - c_{2,1}^2) + \ldots + (c_{1,n}^2 - c_{2,n}^2) = \tilde{y}_1 - \tilde{y}_2 \\ \ldots \\ (2c_{m,1} - 2c_{m-1,1})\tilde{x}_1 + \ldots + (2c_{m,n} - 2c_{m-1,n})\tilde{x}_n + (c_{m-1,1}^2 - c_{m,1}^2) + \ldots + (c_{m-1,n}^2 - c_{m,n}^2) = \tilde{y}_{m-1} - \tilde{y}_m \end{cases}$$

and converting the third system of equations into a matrix form to obtain a fourth system of equations:

$$\begin{bmatrix} (2c_{2,1} - 2c_{1,1}) & \ldots & (2c_{2,n} - 2c_{1,n}) \\ \ldots & & \\ (2c_{m,1} - 2c_{m-1,1}) & \ldots & (2c_{m,n} - 2c_{m-1,n}) \end{bmatrix} \begin{bmatrix} \tilde{x}_1 \\ \ldots \\ \tilde{x}_r \end{bmatrix} =$$

$$\begin{bmatrix} (\ddot{y}_1 - \ddot{y}_2) + \sum_{j=1}^{n} (c_{2,j}^2 - c_{1,j}^2) \\ \ldots \\ (\ddot{y}_{m-1} - \ddot{y}_m) + \sum_{j=1}^{n} (c_{m,j}^2 - c_{m-1,j}^2) \end{bmatrix}$$

wherein the fourth system of equations is the system of linear equations about $(\tilde{x}_1, \ldots, \tilde{x}_n)$ constructed by the linear equations construction component; and solving, by the linear equations solution component, the fourth system of equations with a Gaussian elimination method to obtain a solution set formed by one group or multiple groups of solutions, wherein the number of groups is set as d, and the solution set is denoted by $(\tilde{x}_{a}, \ldots, \tilde{x}_{in})$, $(1 \leq i \leq d)$;

in step C, the group of solutions are $(\bar{x}_1, \ldots, \bar{x}_n)$ and the second affine transformation inversion is $(x_1', \ldots, x_n') = S^{-1}(\bar{x}_1, \ldots, \bar{x}_n)$; and in step D, the result is $(x_1', \ldots, x_n')$ the message is $(y_1', \ldots, y_n')$ and the signature is $(x_1', \ldots, x_n')$ and wherein the verification process further comprises:

in step E, the message is $(y_1', \ldots, y_n')$ and the signature is $(x_1', \ldots, x_n')$ and in step F, each of multivariate polynomials of public key map are $P(x_1, \ldots, x_n)$, that is, calculating $p_1(x_1', \ldots, x_n'), \ldots, p_n(x_1', \ldots, x_n')$ respectively to have results respectively denoted by $y_1'', \ldots, y_n''$, transmitting $y_1'', \ldots, y_n''$ to the processor by the public key transformation component, and determining whether $y_1'', \ldots, y_n''$ is equal to the message $(y_1', \ldots, y_n')$ stored in the processor by the processor: if the $y_1'', \ldots, y_n''$) is equal to the message, the processor outputs "1" to the end user, indicating that the signature is valid; otherwise, the processor outputs "0" to the end user, indicating that the signature is invalid.

2. The method of claim 1, wherein before the signature process, the method for multivariate public key signature/verification further comprise making the signature module be operatable when a selector coupled to the processor is in an open state; and before the verification process, the method further comprises making the verification module be operatable when a selector coupled to the processor is in a close state.

3. The method of claim 2, wherein the processor comprises a scheduler coupled to the selector, and a memory, wherein the scheduler is configured to identify and manage the open state and close state of the selector, and to control and manage data stored in the processor to be scheduled to a corresponding component for a corresponding operation.

4. The method of claim 1, wherein the processor further comprises a memory configured to implement data storage of the processor.

* * * * *